Figure 1:
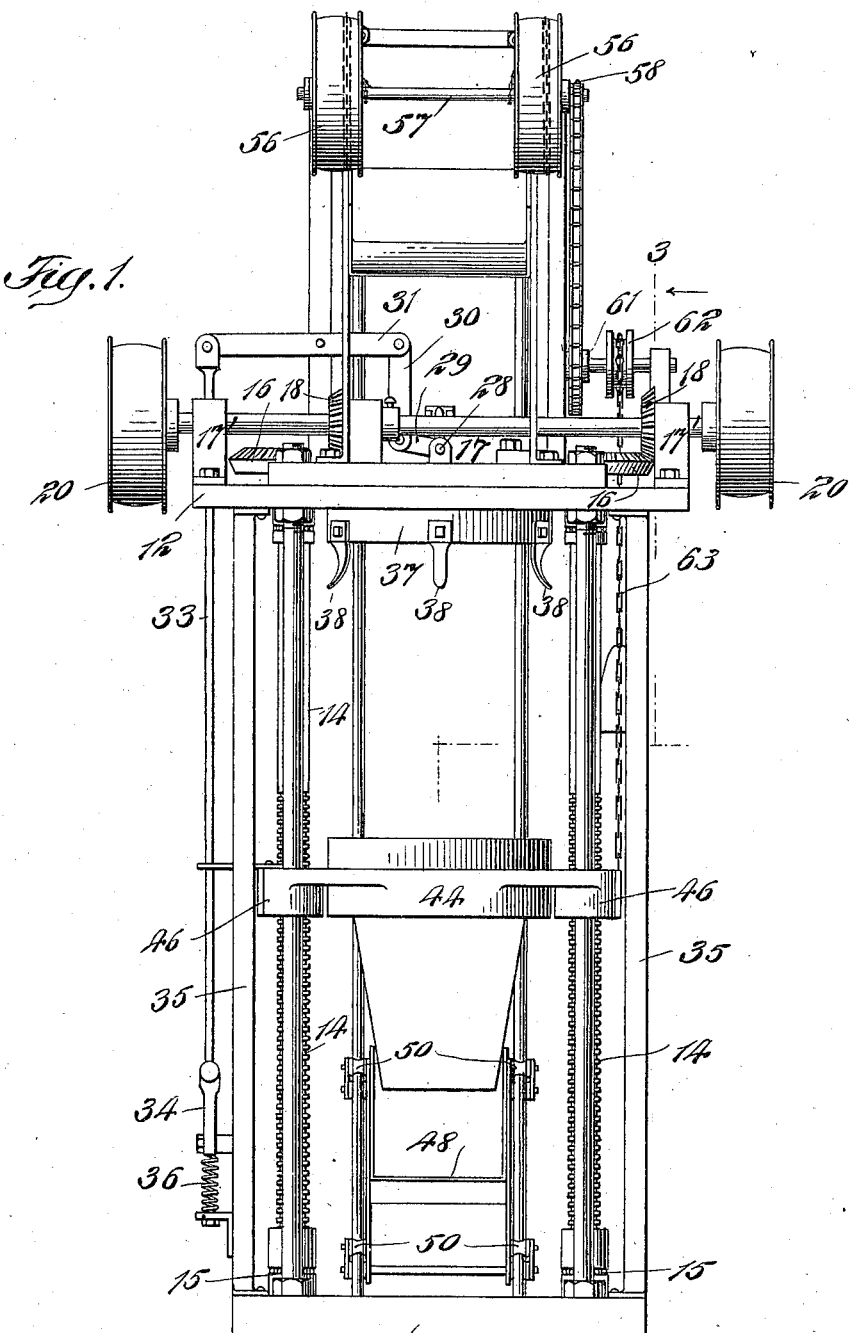

J. STANKOVICH.
APPARATUS FOR THE MANUFACTURE OF BARRELS.
APPLICATION FILED OCT. 16, 1909.

984,167.

Patented Feb. 14, 1911.

4 SHEETS—SHEET 3.

J. STANKOVICH.
APPARATUS FOR THE MANUFACTURE OF BARRELS.
APPLICATION FILED OCT. 16, 1909.

984,167.

Patented Feb. 14, 1911.

4 SHEETS—SHEET 4.

WITNESSES

INVENTOR
Jacob Stankovich
BY
Isaac B. Owens
ATTORNEY

UNITED STATES PATENT OFFICE.

JACOB STANKOVICH, OF NEW YORK, N. Y.

APPARATUS FOR THE MANUFACTURE OF BARRELS.

984,167.

Specification of Letters Patent.   Patented Feb. 14, 1911.

Application filed October 16, 1909.   Serial No. 523,064.

*To all whom it may concern:*

Be it known that I, JACOB STANKOVICH, of the borough of Queens, city and State of New York, have invented certain new and useful Improvements in Apparatus for the Manufacture of Barrels, of which the following is a full, clear, and exact specification, such as will enable others skilled in the art to which it appertains to make and use the same.

In the manufacture of barrels, half barrels, kegs and similar packages, especially the heavy, tight work used by brewers for malt liquors, it is the custom to bow or bend the steamed staves and then apply hooks to the staves to hold them in shape until the staves are assembled ready to receive the hoops. Heretofore it was necessary to remove the stave hooks by manually knocking them off in succession—an operation involving arduous labor and much time. Further, according to the usual practice, the stave hooks thus removed lie around the shop in disorder and a boy or other unskilled laborer must be employed to gather them together and carry them back to the stave bending machine where they are again used. The hooks are removed and before the hoops are driven into place, it is necessary to true up the staves so that their ends are even with each other. This has heretofore been done by a workman striking the ends of the staves with a hammer, which operation also involves the expenditure of a large amount of time.

The object of my invention is to provide a practical machine, by which all of this work may be performed automatically, thus saving in labor and increasing the speed of production. With this end in view, I construct a machine with means for receiving the assembled staves and adapted so that the hooks are automatically acted on to disengage them from the staves. Simultaneously, parts of the machine engage the ends of the staves and true the package so that the hoops may be applied without further operations. The hooks fall from the staves into the chute below the package, from which chute they discharge themselves into an elevator skip. This is arranged automatically to elevate the hooks and discharge them into a slideway or chute which leads back to the stave bending machine or to any other desired point in the plant.

In its preferred design, my improved machine is compact and simple in construction and does not have to be extended through from one floor to another of the factory.

By means of my invention, after the cooper assembles the staves into barrel form, it is only necessary to put the partially constructed package into my improved machine, and by its means the hooks are, by a rapid and automatic operation, disengaged from the package and returned to the stave bending machine and the staves are trued ready to receive the hoops, thus saving greatly in labor and materially increasing the output of the plant. During these operations, the staves are held in assembled form by the temporary truss hoops, well known in the cooperage art.

My invention involves other features of importance and all features will be fully set forth hereinafter and particularly pointed out in the claims.

Reference is had to the accompanying drawings which illustrate as an example the preferred manner in which the principles of my invention may be practically embodied, in which drawings:—

Figure 2:
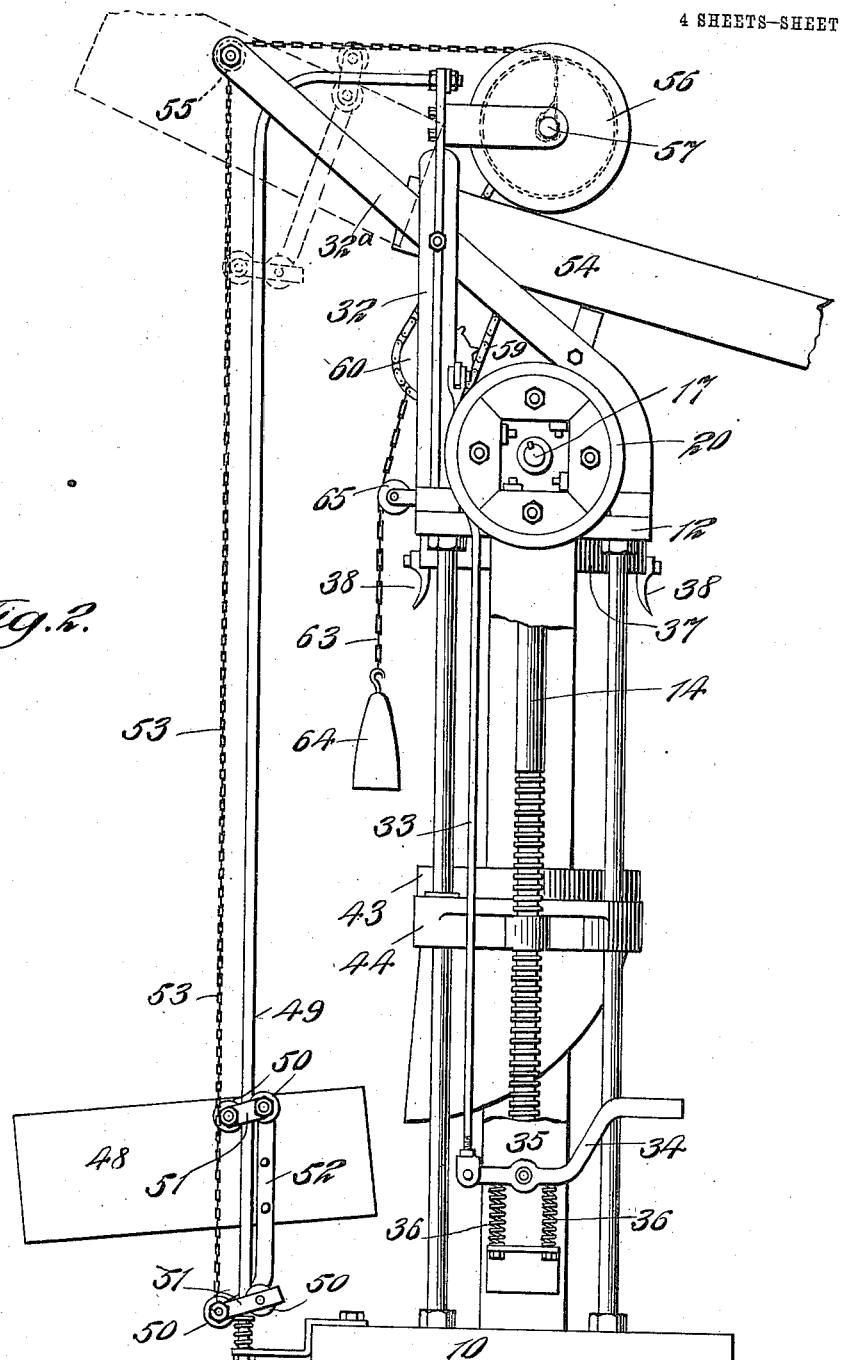
Figure 3:
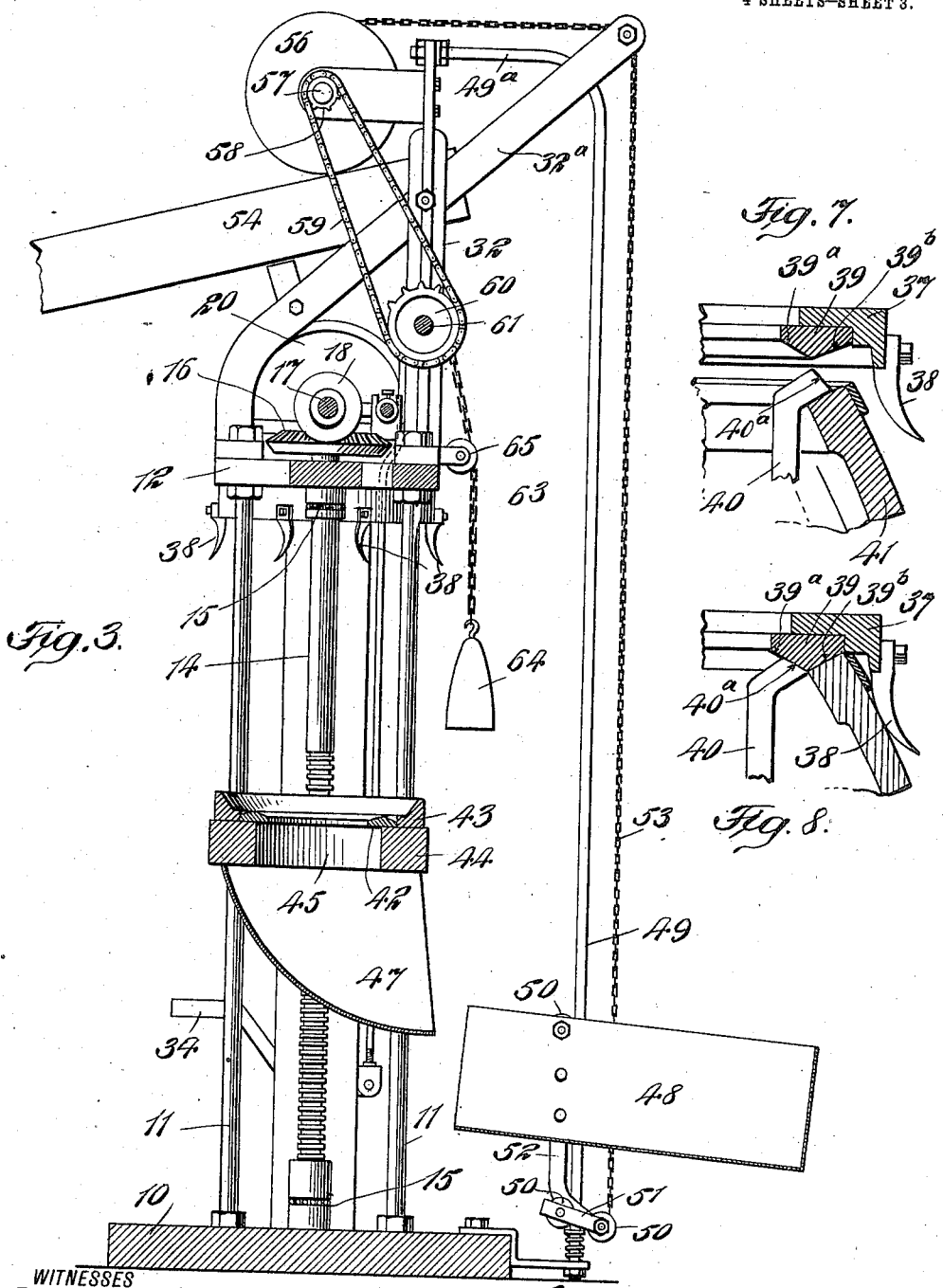
Figure 4:
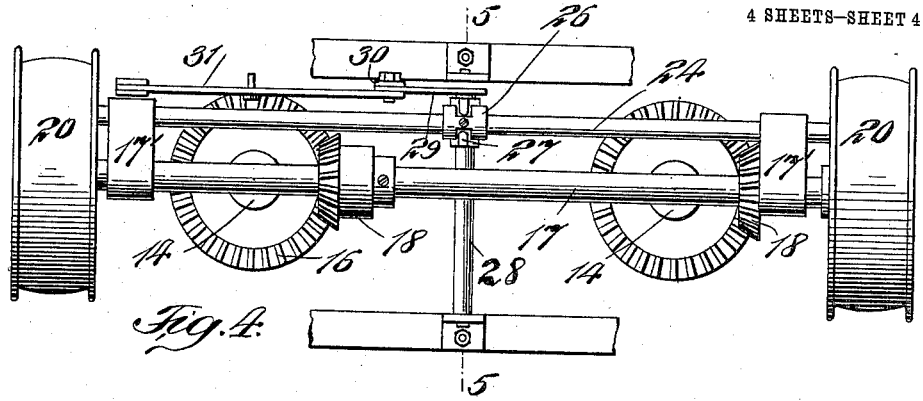
Figure 5:
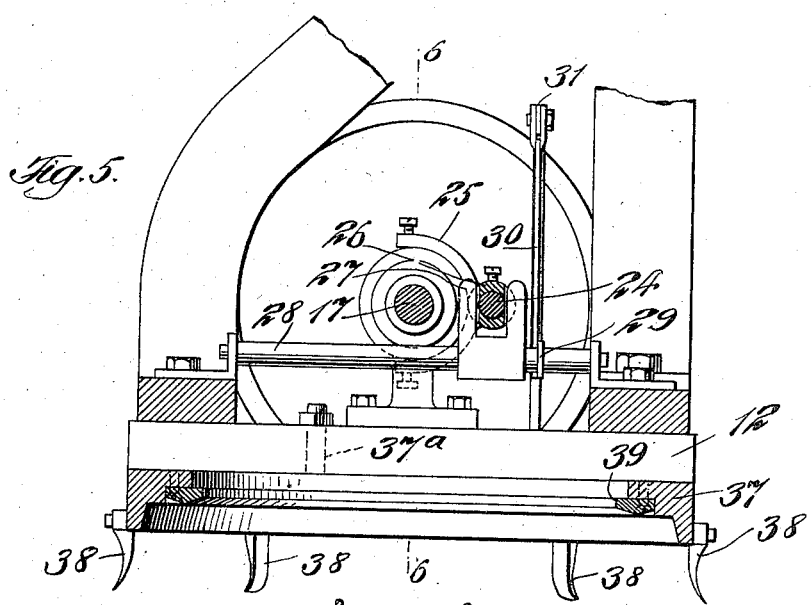
Figure 6:
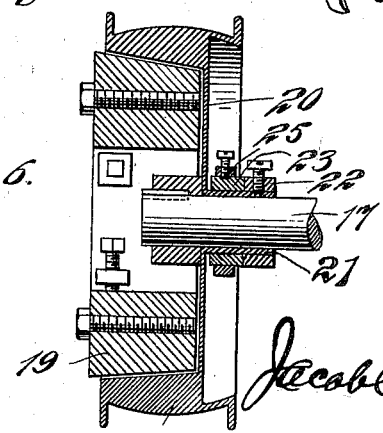

Figure 1 is a front elevation of the complete machine; Fig. 2 is a side elevation thereof; Fig. 3 is a vertical sectional elevation on the line 3—3 of Fig. 1 looking in the direction of the arrows applied to said line; Fig. 4 is a plan view showing the gearing for rotating the screws which operate the drivehead or traveler; Fig. 5 is an enlarged transverse section on the line 5—5 of Fig. 4; Fig. 6 is an enlarged section through one of the driving pulleys showing the clutch thereof; Fig. 7 is a fragmentary sectional view showing the action of the cam-rings on the stave hooks and staves, the view illustrating the parts immediately before engagement; and Fig. 8 is a similar view of the same parts except that the cam-rings are engaged with the staves truing them and the stave hooks have been disengaged from the staves.

10 indicates the base of the machine which is intended to be fastened upon the floor of the factory, from which rise four stanchions 11 in rectangular arrangement and serving to carry the rigid upper frame member or head 12. These parts 10, 11 and 12 constitute the main frame of the machine and compose a rigid unit.

Mounted on each side of this frame and extending vertically between the adjacent stanchions is a screw 14. These screws have suitable bearings 15, preferably of the ball type in the base 10 and head 12; and the upper ends of such screws project loosely through the head 12 to carry fixedly the miter gears 16. Revolubly mounted in boxes 17′, carried by the head 12, is a horizontally disposed revoluble shaft 17, furnished with fixedly secured miter gears 18 in mesh with the gears 16 and by means of which the screws 14 are rotated correspondingly from the shaft 17. At each end the shaft 17 carries securely a friction block 19, said block having frusto-conical surface and being received within the correspondingly shaped pulleys 20. The pulleys 20 are furnished with hubs 21 loose on the shaft 17, and having flanges or rigid collars 22 which serve to retain the loose rings 23. By means of devices, which will be hereinafter explained, the collars 22 serve to retain the loose rings 23. By means of devices, which will also be hereinafter explained, the collars 23 are moved along the shaft 17 to shift the pulleys 20 in and out of engagement with the friction blocks 19, and in this manner fixing or releasing the pulleys to or from the friction blocks. The pulleys 20 are preferably flanged and are adapted to be driven by belts in opposite directions so that upon releasing one pulley and engaging the other the shaft 17 will be driven in one direction and by reversing the adjustment of the pulleys the shaft will be driven in the opposite direction. In this manner the screws 14 may be rotated at will in either direction for a purpose which will hereinafter fully appear. The bearings 17′, before described, also serve as supports for a reach rod 24, which as shown best in Fig. 5 has forks 25 at its ends engaging the collars 23 before described, so that upon sliding the reach rod in one direction or another the driving pulleys will be shifted as described. To so operate the reach rod 24, it is provided with a fixed collar 26 engaged by a fork 27 on a rock shaft 28 extending transversely under the shaft 17 and rod 24 and suitably mounted on the head of the machine. The rock shaft 28 is operated through an arm 29 attached thereto (see Figs. 1 and 5). To this arm is articulated a link 30 which in turn is articulated to a lever 31, fulcrumed on the super-structure 32 of the framing. The lever 31 is operated by a rod 33 which extends downward from the outer end of the lever and at its lower end is joined to a hand lever 34 fulcrumed on one of two columns 35 which extend between the base 10 and head 12 and serve primarily to reinforce the tie bars or stanchions 11. Springs 36 are engaged with the lever 34 to hold the same yieldingly in intermediate position so that normally both of the pulleys 20 are disengaged from their friction blocks and turning idly on the then stationary shaft 17. When the screws 14 are to be driven the operator throws the hand lever 34 in one direction or other, thus shifting the reach rod 24 to one side or other and engaging one of the pulleys 20 with its friction block so that the shaft 17 is rotated, driving the screws in the desired direction. To reverse the movement of the screws the hand lever 34 should be thrown to its opposite position. In this manner the operation of the screws may be fully controlled.

As shown in the drawings, particularly Fig. 5, the underside of the head 12 of the frame carries a holder-ring 37, which is centrally located and suitably fastened, for example, by bolts, one of which is indicated at 37$^a$ in Fig. 5. This holder-ring 37 carries guiding spurs 38 which serve to guide the barrel or other package into accurate engagement with the ring. Said holder-ring 37 is designed to carry the cam-ring 39 as is best shown in Figs. 7 and 8. This cam-ring has two faces 39$^a$ and 39$^b$ respectively, which are tapered oppositely to each other and are adapted, the first cam face, to engage the taper surface 40$^a$ of the stave hooks 40 and move them laterally inward out of engagement with the staves 41, while the outer cam surface 39$^b$, is designed to move into engagement with the ends of the staves truing them into a perfect package. These operations are illustrated in Figs. 7 and 8, the former of which shows the cam-ring about to engage the hook and stave and the latter of which shows the engagement complete, the surface 39$^b$ truing the staves and the hook disengaged from the stave and about to fall out of the package through the open bottom thereof.

The cam-ring 39 is adapted to engage the upper end of the package, while a similar cam-ring 42 is designed to engage the lower end of the package, and perform the same operations at the lower end which are performed at the upper end. This cam-ring 42 is held in position by a holder-ring 43 similar to the ring 37 before described. These parts 42 and 43 are mounted on the traveler 44, which has a central opening 45 to allow the stave hooks to drop through it and which traveler, as shown in Fig. 1, has nuts 46 respectively engaged with the screws 14, so that as the screws rotate the traveler is moved up or down in accordance with the direction of rotation of the screws. When, therefore, a group of staves (assembled in barrel form and held by the usual truss-hoops and having the stave hooks engaged, as shown) is placed vertically with its lower end resting on the cam-ring 42, and the traveler 44 is moved upward, the guide fingers 38 serve to direct the upper end of this group of staves into proper engagement with the upper cam-ring 37 and when this takes place and pressure is exerted by the two cam-rings against the respective ends of the group of staves, the inner cam surfaces of the rings 39 and 42 engage the tapered ends of the stave hooks and disengage said hooks from the staves, and immediately thereafter the inner cam surfaces of the rings engage the staves and true them, so that upon reversal of the movement of the traveler the package may be taken from the machine and passed on to the next stage in the construction of the finished product. The stave hooks thus disengaged from the group of staves fall through the center of such group or package and pass, through the opening 45 in the traveler, into a chute 47, which directs them laterally into a skip 48. This skip is mounted on guide rods 49 by means of pairs of rollers 50 engaging opposite sides of the guide rails. The members of the pairs of rollers 50 are connected by links 51. Arms 52 are fastened to the sides of the skip and to the ends of said arms opposite ends of the upper and lower links 51 are pivoted.

53 indicates chains which are attached to the pivoted ends of the lower links 50, one at each side of the skip and by which chains the skip is raised and permitted to drop by gravity. The guide rails or rods 49 extend upward to the top of the machine and then curve over horizontally as indicated at 49ª and when the chains 53 raise the skip its peculiarly linked rollers 50 permit it to ride up around the horizontal ends of the guide rails and cause the skip to assume an inclined dumping position shown by broken lines in Fig. 2. When the skip is so dumped it is directly contiguous to a chute 54, the upper end of which is mounted on the superstructure 32 of the frame of the machine. This chute extends off from the machine to any desired point at which the stave hooks are to be delivered, for example, to the stave bending machine with which the cooperage plants are usually equipped. It will thus appear that the stave hooks fall from the chute 47 into the skip 48 and as said skip is raised and dumped the stave hooks are delivered into the chute 54 and pass from the machine.

Devices are provided by which the skip 48 is caused to be lowered at the time the traveler 44 is lifted, so that upon the disengagement of the stave hooks they fall from the chute 47 into the skip which is lowered into position to receive them. The skip is also arranged to be lifted as the traveler is lowered so that the former is dumped while the latter is lowered into position to receive a second package. Pursuant to this end the framing of the machine is provided with extension arms 32ª forming part of the super-structure of the frame and said arms are fitted with rollers 55 over which chains 53 pass. From said rollers the chains pass over drums 56 mounted on a horizontal shaft 57 carried in the superstructure and provided with the sprocket 58 over which a sprocket chain 59 passes. Said chain extends down around a sprocket wheel 60 carried on a short shaft 61, and said shaft as best shown in Fig. 1 is fitted with a chain sheave 62 by which the shaft 61 is driven through the medium of a chain 63. The chain 63 has one end fastened to the traveler 44 while the other end is provided with a weight 64 and is adapted to run past an idler mounted on the head of the frame of the machine. With the gearing arranged as described, upon the descent of the table 44 the skip 48 is raised and upon the ascent of the table the weight of the skip is sufficient to overcome the friction of the gearing and the heft of the weight 64, whereupon the skip moves by gravity to its lower position.

The organized operation of my invention may be traced, as follows: As before intimated, it is usual to bend the staves in a bending machine and engage a stave hook with each stave to hold it bent. It is also usual, immediately after the bending operation, to assemble a number of staves into barrel form and apply temporarily the so-called truss hoops. The partially formed package should now be placed upon the cam-ring of the table 44, said table having first been lowered to admit of conveniently lifting the package thereon. When this is done, the operator should manipulate the hand lever 34 in that direction which will cause the screws 14 to raise the table. This operation continues until the upper and lower cam-rings forcibly engage the stave hooks and staves, and disengage the hooks from the staves and true the latter. At this instant the operator should reverse the hand-lever 34 and cause the screws to reverse the movement of the table 44 returning the same to its lower position. When the table is thus returned the package may be placed in position preparatory to repeating the operation. While this has been going on the stave hooks will have fallen through the interior of the package into the chute 47 and from this they are projected into the skip 48. This movement of the stave hooks takes place before or simultaneously with the beginning of the descent of the table, so that as the table moves downward it draws on the chain 63 and raises the skip in the manner described heretofore, until the skip dumps its contents into the chute 54. This is timed to happen when the descent of the table is complete; and when the table again moves upward for a second operation the skip is allowed to return to its lower position so that it may receive the hooks falling as a result of the said second operation.

From the aforegoing it will follow that my invention enables a single, unskilled laborer to do the work heretofore performed by skilled mechanics and unskilled helpers; and not only this, but my invention allows this single operator to perform many times the amount of work heretofore performed by a skilled mechanic and helper. The importance of my invention therefore is apparent.

The apparatus may be readily adjusted to packages of different sizes by changing the cam-rings. This may be effected in various manners. I prefer, however, to employ a different size holder-ring for each cam-ring and to place the bottom holder-rings one on and in the other, while the top holder-rings may be removed at will by releasing the bolts $37^a$ to permit the application of a different size holder-ring and its corresponding cam-ring.

This application covers substantially the same subject matter as my previous application Serial Number 378,343 filed June 11, 1907 and abandoned in favor of this application.

Having thus described my invention, what I claim as new and desire to secure by Letters Patent of the United States, is:

1. An organized machine for assembling barrel parts comprising means which automatically engage the stave hook and disengage the same from the stave and operating devices for said means.

2. An organized machine for assembling barrel parts comprising means which automatically engage the stave hook to impart movement thereto laterally with respect to the stave, whereby to disengage the hook from the stave and operating devices for said means.

3. An organized machine for assembling barrel parts comprising a support for the staves assembled in barrel form, a cam which automatically engages the end of the stave hooks to impart movement thereto laterally with respect to the stave to disengage the hook from the stave and means for operating the cam.

4. An organized machine for removing stave hooks, having a cam-ring adapted to engage the ends of the stave hooks of a series of staves set up in barrel form to simultaneously move the same inward out of engagement with the staves.

5. An organized machine for assembling barrel parts, comprising means which automatically and simultaneously engage the ends of the stave hooks of a series of staves assembled in barrel form and disengage the hooks from the staves and devices for operating said means.

6. An organized machine for assembling barrel parts, comprising means which automatically and simultaneously engage the ends of the stave hooks of a series of staves assembled in barrel form and move the hooks laterally inward from the staves and operating devices for said means.

7. An apparatus for removing stave hooks, comprising two rings, and means for simultaneously driving the same against the ends of the hooks of a series of staves set up in barrel form to move the hooks inward from the staves.

8. An apparatus for removing stave hooks, comprising a stationary member, a movable member adapted to carry the staves, said members being adapted to engage the respective ends of the stave hooks and move them laterally inward out of engagement with the staves, and means for operating the movable member toward and from the stationary member.

9. An organized machine for assembling barrel parts comprising a means to sustain an assemblage of staves in barrel form, a hook disengaging device, operating means therefor arranged in such relation to the barrel sustaining means as to automatically engage the hooks, the machine being open under the assemblage of staves to permit the fall of the hooks and a means located in the opening to receive and convey the hooks from the machine.

10. In an apparatus for the manufacture of barrels, the combination of two cam-rings adapted to engage the ends of the stave hooks of a series of staves assembled in barrel form and move them inward out of engagement with the staves, means for rigidly mounting one ring and means for movably mounting the other ring so that it may move toward and from the first ring.

11. In an apparatus for the manufacture of barrels, the combination of two cam-rings adapted to engage the ends of the stave hooks of a series of staves assembled in barrel form and move them inward out of engagement with the staves, means for rigidly mounting one ring, means for movably mounting the other ring so that it may move toward and from the first ring, and a discharge chute carried with the second ring and arranged to receive the disengaged hooks.

12. In an apparatus for the manufacture of barrels, the combination of two cam-rings adapted to engage the ends of the stave hooks of a series of staves set up in barrel form and move them inward out of engagement with the staves, means for rigidly mounting one ring, means for movably mounting the other ring so that it may move toward and from the first ring, and means for receiving the hooks and conveying them from the machine.

13. An organized machine for assembling barrel parts, comprising a means arranged to sustain an assemblage of staves in barrel form, a stave hook disengaging device and operating means therefor arranged in such relation to the barrel sustaining means as to automatically engage the hooks.

14. An organized machine for assembling barrel parts comprising the combination of means for automatically disengaging the stave hooks from the staves, an elevator adapted to receive the disengaged hooks and a conveyer into which the elevator automatically discharges the hooks.

15. An organized machine for assembling barrel parts comprising the combination of means for automatically disengaging the hooks from the staves, a chute receiving the disengaged hooks, an elevator which the chute discharges, and an elevated conveyer into which the elevator discharges for the purpose specified.

16. An organized machine for assembling barrel parts, comprising the combination of means for holding a number of staves assembled in barrel form and for automatically disengaging the stave hooks from the said staves, and devices having operative connection with said means and driven in unison therewith to convey the disengaged hooks from the machine.

17. An organized machine for assembling barrel parts, comprising the combination of means for automatically disengaging the hooks from the staves, an elevator adapted to receive the disengaged hooks, an elevated conveyer, and means for automatically dumping the contents of the elevator into the conveyer controlled by said means for disengaging the hooks.

18. In an apparatus for the manufacture of barrels, the combination of a stationary cam-ring, a coacting movable cam-ring, means for mounting the latter, a chute movable with said means, an elevator adapted to receive the disengaged hooks from the chute, a conveyer receiving the hooks from the elevator, and means connecting the elevator and the said means for mounting the movable cam-ring, whereby to operate said elevator.

19. In an apparatus for the manufacture of barrels, the combination of a frame, a stationary cam-ring held thereby, a traveling table, a movable cam-ring carried thereby, means for raising and lowering the table, a chute carried by the table for the purpose specified, a track, an elevator, running thereon, and receiving the hooks from the chute, an elevator conveyer, means for dumping the contents of the elevator into the conveyer, and means connecting the table and elevator to cause said parts to move simultaneously in opposite directions.

20. The combination of a cam member, a stave hook having a beveled end adapted to engage the cam member, and means for moving one of said parts toward and from the other.

21. An apparatus for manufacturing barrels and other packages comprising a part serving to engage the stave hooks to disengage them from the staves and simultaneously to engage the ends of the staves to true the package and means for operating said part.

22. In an apparatus for manufacturing barrels and other packages, the combination with a support for the assembled staves, of means associated therewith to engage the stave hooks whereby to disengage them from the staves and simultaneously to engage the ends of the staves to true the package, and means for causing relative movement between said support and said disengaging means.

23. An apparatus for manufacturing barrels and other packages comprising a part having a cam surface adapted to engage the stave hooks of a series of staves set up in barrel form to disengage the same from the staves and said part simultaneously engaging the ends of the staves to true the package and means for operating said part.

24. In an apparatus for manufacturing barrels and other packages, the combination with a pair of oppositely-disposed members, one of which is movable and the other stationary, of means carried by each of said members to engage the ends of the stave hooks whereby to disengage them from the staves and simultaneously to engage the ends of the staves to true the package, and means for moving the movable member toward and away from the stationary member.

25. An apparatus for manufacturing barrels and other packages comprising two members adapted simultaneously to engage the ends of the stave hooks of a series of staves set up in barrel form and move the hooks laterally inward from the staves, said members also serving to engage the ends of the staves at opposite ends of the package and true the package and means for operating one of said members.

26. An organized machine for removing hooks from barrel staves comprising a support adapted to sustain a series of staves assembled in barrel form while leaving exposed the ends of the hooks upon said staves and means for engaging the exposed ends of said hooks and forcing said hooks from the staves.

27. A machine for removing hooks from staves comprising oppositely-operating cam faces actuated longitudinally of the hook to move it laterally from the stave.

28. A machine for removing a hook with beveled ends from a barrel stave, comprising means actuated longitudinally of the hook and operating transversely thereof and a rigid guide for causing said means to move only longitudinally of the stave.

29. A device for removing a hook having a beveled end from a barrel stave comprising means for engaging said beveled end and means operating longitudinally of the hook whereby the beveling of said end forces the hook from the stave.

30. The combination with a hook driving machine of devices operated thereby for positively engaging the stave hooks and removing them from the staves.

31. In an organized machine for the manufacture of barrels, the combination of a double cam member and means for bringing about the successive engagement of the faces of said cam with the stave hooks of a number of staves assembled in barrel form to disengage the hooks from the staves and with the ends of the staves to true the same.

32. In an organized machine for the manufacture of barrels, the combination of a cam-ring having two oppositely-disposed beveled or inclined faces and means for bringing about successive engagement of said faces with the ends of the stave hooks of a number of staves assembled in barrel form to disengage the stave hooks from the staves, and with the beveled ends of the staves to true the staves.

33. An organized machine for the manufacture of barrels, the combination of a means adapted to coact with the stave hooks of a number of staves assembled in barrel form to disengage said hooks from the staves, means for bringing about said coaction and guide fingers juxtaposed to the first-named means to guide the same into engagement with the stave hooks.

In testimony whereof I have signed my name to this specification in the presence of two subscribing witnesses.

JACOB STANKOVICH.

Witnesses:
SCHLENZ GYOREPP,
FAREK HULRICZEK.